United States Patent
Kumar et al.

(10) Patent No.: US 8,254,459 B2
(45) Date of Patent: *Aug. 28, 2012

(54) ADAPTIVE MOTION ESTIMATION

(75) Inventors: Roger Kumar, San Francisco, CA (US);
Thomas Pun, Sunnyvale, CA (US);
Xiaochun Nie, Cupertino, CA (US);
Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/772,971

(22) Filed: May 3, 2010

(65) Prior Publication Data

US 2011/0019879 A1    Jan. 27, 2011

Related U.S. Application Data

(63) Continuation of application No. 10/427,890, filed on Apr. 30, 2003, now Pat. No. 7,742,525.

(60) Provisional application No. 60/395,964, filed on Jul. 14, 2002, provisional application No. 60/395,965, filed on Jul. 14, 2002.

(51) Int. Cl.
*H04B 1/66* (2006.01)
*H04N 7/12* (2006.01)

(52) U.S. Cl. .................................. 375/240.16

(58) Field of Classification Search ............... 375/240.01–240.29; H04B 1/66; H04N 7/12
See application file for complete search history.

(56) References Cited

U.S. PATENT DOCUMENTS

| | | | |
|---|---|---|---|
| 5,060,285 | A | 10/1991 | Dixit et al. |
| 5,200,820 | A | 4/1993 | Gharavi |
| 5,488,419 | A | 1/1996 | Hui et al. |
| 5,508,744 | A | 4/1996 | Savatier |
| 5,576,767 | A | 11/1996 | Lee et al. |
| 5,696,698 | A | 12/1997 | Herluison et al. |
| 5,706,059 | A | 1/1998 | Ran et al. |
| 5,731,850 | A | 3/1998 | Maturi et al. |
| 5,757,668 | A | 5/1998 | Zhu |
| 5,808,626 | A | 9/1998 | Givens et al. |
| 5,872,604 | A | 2/1999 | Ogura |

(Continued)

FOREIGN PATENT DOCUMENTS

EP    1610561    12/2005

(Continued)

OTHER PUBLICATIONS

U.S. Appl. No. 12/843,840, filed Jul. 26, 2010, Tong, Xin, et al.

(Continued)

*Primary Examiner* — Tung Vo
(74) *Attorney, Agent, or Firm* — Adeli & Tollen LLP

(57) ABSTRACT

Some embodiments of the invention provide a method for adaptively performing motion estimation. In some embodiments, the method initially performs a first motion estimation operation. It then determines whether the estimated error in the result of the first motion estimation is greater than a particular threshold. If not, the method uses the results of the first motion estimation operation. Otherwise, the method selects another motion estimation operation. The method continues in this manner until it performs a motion estimation operation that results in an acceptable estimated error, or until it tries all the motion estimation operations at its disposal. When the method cannot identify a motion estimation operation that produces results with an acceptable estimated error, the method selects the result of the motion estimation operation that produced the best results.

25 Claims, 6 Drawing Sheets

U.S. PATENT DOCUMENTS

| | | | |
|---|---|---|---|
| 5,929,940 A | 7/1999 | Jeannin | |
| 6,014,181 A | 1/2000 | Sun | |
| 6,081,209 A | 6/2000 | Schuyler et al. | |
| 6,128,047 A | 10/2000 | Chang et al. | |
| 6,192,081 B1 | 2/2001 | Chiang et al. | |
| 6,212,237 B1 | 4/2001 | Minami et al. | |
| 6,289,050 B1 | 9/2001 | Ohtani et al. | |
| 6,307,970 B1 | 10/2001 | Schuyler et al. | |
| 6,363,117 B1 | 3/2002 | Kok | |
| 6,380,986 B1 | 4/2002 | Minami et al. | |
| 6,462,791 B1 | 10/2002 | Zhu | |
| 6,483,876 B1 | 11/2002 | Chang et al. | |
| 6,498,815 B2 | 12/2002 | Kleihorst et al. | |
| 6,529,634 B1 | 3/2003 | Thyagarajan et al. | |
| 6,542,808 B2 * | 4/2003 | Mintz | 701/117 |
| 6,549,668 B1 * | 4/2003 | Pezzoni et al. | 382/236 |
| 6,567,469 B1 * | 5/2003 | Rackett | 375/240.16 |
| 6,584,155 B2 | 6/2003 | Takeda et al. | |
| 6,646,578 B1 | 11/2003 | Au | |
| 6,668,020 B2 | 12/2003 | Ma et al. | |
| 6,671,321 B1 * | 12/2003 | Ohtani et al. | 375/240.16 |
| 6,687,301 B2 * | 2/2004 | Moschetti | 375/240.16 |
| 6,700,996 B1 * | 3/2004 | Aldrich et al. | 382/107 |
| 6,754,369 B1 * | 6/2004 | Sazawa | 382/105 |
| 6,813,315 B1 * | 11/2004 | Auyeung et al. | 375/240.16 |
| 6,829,373 B2 * | 12/2004 | Piccinelli et al. | 382/107 |
| 6,842,483 B1 | 1/2005 | Au et al. | |
| 6,876,703 B2 * | 4/2005 | Ismaeil et al. | 375/240.16 |
| 6,895,361 B2 | 5/2005 | Yang | |
| 6,947,603 B2 | 9/2005 | Kim | |
| 6,995,804 B2 * | 2/2006 | Kwon et al. | 348/663 |
| 7,177,359 B2 | 2/2007 | Song et al. | |
| 7,239,721 B1 * | 7/2007 | Kumar et al. | 382/107 |
| 7,260,148 B2 | 8/2007 | Sohm | |
| 7,280,597 B2 | 10/2007 | Zhang et al. | |
| 7,412,080 B2 * | 8/2008 | Kumar et al. | 382/107 |
| 7,555,043 B2 | 6/2009 | Sato et al. | |
| 7,646,437 B1 | 1/2010 | Dumitras et al. | |
| 7,720,155 B2 * | 5/2010 | Seo | 375/240.16 |
| 7,742,525 B1 * | 6/2010 | Kumar et al. | 375/240.16 |
| 7,751,476 B2 | 7/2010 | Tanizawa et al. | |
| 7,792,188 B2 | 9/2010 | Tong et al. | |
| 8,018,994 B2 | 9/2011 | Tong et al. | |
| 8,111,752 B2 | 2/2012 | Kumar et al. | |
| 2001/0008545 A1 | 7/2001 | Takeda et al. | |
| 2001/0019586 A1 * | 9/2001 | Kang et al. | 375/240.16 |
| 2002/0025001 A1 | 2/2002 | Ismaeil et al. | |
| 2002/0131500 A1 | 9/2002 | Gandhi et al. | |
| 2003/0202594 A1 | 10/2003 | Lainema | |
| 2003/0206594 A1 | 11/2003 | Zhou | |
| 2004/0057515 A1 | 3/2004 | Koto et al. | |
| 2004/0151381 A1 | 8/2004 | Porter et al. | |
| 2004/0165662 A1 | 8/2004 | Battistella | |
| 2005/0135484 A1 | 6/2005 | Lee et al. | |
| 2005/0179572 A1 | 8/2005 | Winger | |
| 2005/0286630 A1 | 12/2005 | Tong et al. | |
| 2005/0286635 A1 | 12/2005 | Kumar et al. | |
| 2005/0286777 A1 | 12/2005 | Kumar et al. | |
| 2006/0251330 A1 | 11/2006 | Toth et al. | |
| 2010/0290526 A1 | 11/2010 | Tong et al. | |
| 2011/0286522 A1 | 11/2011 | Tong et al. | |

FOREIGN PATENT DOCUMENTS

| | | |
|---|---|---|
| EP | 1610563 | 12/2005 |
| GB | 2348559 | 10/2000 |
| JP | 5-64015 | 3/1993 |
| JP | 8-56362 | 2/1996 |
| JP | 11-328369 | 11/1999 |
| JP | 2001-251632 | 9/2001 |
| JP | 2003-523652 | 8/2003 |
| JP | 2003-319394 | 11/2003 |
| JP | 2004-7337 | 1/2004 |
| JP | 2005-191706 | 7/2005 |
| JP | 2007-503784 | 2/2007 |
| WO | WO 03/005700 | 1/2003 |
| WO | WO 2006/004667 | 1/2006 |

OTHER PUBLICATIONS

Updated portions of prosecution history of U.S. Appl. No. 11/119,428, Sep. 14, 2010, Kumar, Roger, et al.

Portions of prosecution history of U.S. Appl. No. 10/427,891, Apr. 20, 2007, Kumar, Roger, et al.

Portions of prosecution history of U.S. Appl. No. 11/751,552, Jul. 2, 2008, Kumar, Roger, et al.

Portions of prosecution history of U.S. Appl. No. 10/427,890, Apr. 14, 2010, Kumar, Roger, et al.

Portions of prosecution history of U.S. Appl. No. 11/119,428, Apr. 20, 2010, Kumar, Roger, et al.

International Search Report and Written Opinion for PCT/US2005/022743, May 21, 2007 (mailing date), Apple Computer, Inc.

International Preliminary Report on Patentability for PCT/US2005/022743, Jun. 19, 2007 (issuance date), Apple Computer, Inc.

Turaga, Deepak, et al., "Search algorithms for block-matching in motion estimation", pp. 1-14, Apr. 1998.

Author Unknown, "Test Model 5", International Organization for Standardisation, Apr. 1993, pp. 1-119, Document AVC-491b, Version 2.

U.S. Appl. No. 13/196,886, filed Aug. 2, 2011, Tong, Xin, et al.

Updated portions of prosecution history of U.S. Appl. No. 10/427,891, Apr. 30, 2007, Kumar, Roger, et al.

Updated portions of prosecution history of U.S. Appl. No. 11/751,552, Jul. 11, 2008, Kumar, Roger, et al.

Updated portions of prosecution history of U.S. Appl. No. 10/427,890, Apr. 29, 2010, Kumar, Roger, et al.

Updated portions of prosecution history of U.S. Appl. No. 11/119,428, Jun. 15, 2011, Kumar, Roger, et al.

Portions of prosecution history of U.S. Appl. No. 11/119,414, Jul. 18, 2011, Kumar, Roger, et al.

Portions of prosecution history of U.S. Appl. No. 11/070,778, Jul. 27, 2010, Tong, Xin, et al.

Portions of prosecution history of U.S. Appl. No. 12/843,840, Aug. 1, 2011, Tong, Xin, et al.

Portions of prosecution history of EP 05291379, Jan. 13, 2011 (mailing date), Apple Inc.

Portions of prosecution history of EP 05291381, Oct. 20, 2010 (mailing date), Apple Inc.

Choi, Woong Il, et al., "Fast motion estimation and mode decision with variable motion block sizes," Visual Communications and Image Processing, Proceedings of SPIE, Month Unknown, 2003, pp. 1561-1572, vol. 5150, SPIE.

Clarke, R.J., et al., "Digital Compression of Still Images and Video, Other Intraframe Techniques. 2: Quadtree, Multiresolution and Neural Approaches," Jan. 1, 1995, pp. 195-205, Academic Press, London, UK.

Keissarian, F., "New Quadtree Predictive Image Coding Technique Using Pattern-Based Classification," Visual Communications and Image Processing, Jul. 8, 2003, pp. 1481-1490, vol. 5150.

Strobach, P., "Tree-Structured Scene Adaptive Coder," IEEE Transactions on Communications, Apr. 1, 1990, vol. 38, No. 4, IEEE Service Center, Piscataway, New Jersey.

Sullivan, G. J., et al. "Efficient Quadtree Coding of Images and Video," International Conference on Acoustics, Speech & Signal Processing, Toronto, Apr. 14, 1991, vol. CONF. 16, IEEE, New York.

Tanizawa, Akiyuki, et al., "A Study on Fast Rate-Distortion Optimized Coding Mode Decision for H.264," 2004 International Conference on Image Processing (ICIP), Oct. 24-27, 2004, pp. 793-796, vol. 2, IEEE.

Wang, Y., et al., "A Motion Vector Search Algorithm Based on a Simple Search-Block Interpolation Scheme," IEICE Transactions on Communications, Feb. 1, 2004, pp. 384-389, vol. E87B, No. 2, Communications Society, Tokyo, Japan.

Wiegand, T., et al., "Entropy-Constrained Design of Quadtree Video Coding Schemes," Sixth International Conference on Image Processing and Its Applications, Jul. 14, 1997, pp. 36-40, vol. 1, IEE, Dublin, UK.

U.S. Appl. No. 13/333,635, filed Dec. 21, 2011, Kumar, Roger, et al.

Updated portions of prosecution history of U.S. Appl. No. 11/119,428, Dec. 27, 2011, Kumar, Roger, et al.

Portions of prosecution history of U.S. Appl. No. 13/333,635, Mar. 9, 2012, Kumar, Roger, et al.

Updated portions of prosecution history of U.S. Appl. No. 11/119,414, Feb. 23, 2012, Kumar, Roger, et al.

Updated portions of prosecution history of EP05291379, Feb. 20, 2012, Apple Inc.

Updated portions of prosecution history of EP05291381, Feb. 20, 2012, Apple Inc.

\* cited by examiner

Reference Frame

Current Frame

ADAPTIVE MOTION ESTIMATION

CLAIM OF BENEFIT TO PRIOR APPLICATIONS

This Application is a continuation application of U.S. patent application Ser. No. 10/427,890, filed Apr. 30, 2003 now U.S. Pat. No. 7,742,525. U.S. patent application Ser. No. 10/427,890 claims the benefit of the U.S. Provisional Patent Application 60/395,964, filed Jul. 14, 2002, and U.S. Provisional Patent Application 60/395,965, filed Jul. 14, 2002. U.S. patent application Ser. No. 10/427,890, and U.S. Provisional Patent Applications 60/395,964 and 60/395,965 are incorporated herein by reference.

FIELD OF THE INVENTION

The present invention is directed towards a method for adaptively performing motion estimation.

BACKGROUND OF THE INVENTION

A motion estimator in an MPEG encoding scheme tries to identify a motion vector that specifies the difference in position of an image block in two different image frames. These two frames are a reference frame and a current frame. There are a variety of different motion estimation techniques. For instance, some motion estimators use a predicted motion vector to start their analysis, while others do not.

Also, some motion estimators are hierarchical in nature while others are not. Hierarchical motion estimators use coarse searches to quickly find a rough estimate of the motion vector, and then refine the vector estimate by performing additional searches at finer level or levels of granularity. Examples of such hierarchical techniques include techniques that examine image blocks at different image resolutions (e.g., examine down-sampled image blocks, and then examine image blocks at higher and higher resolutions).

Other hierarchical techniques are step-size reducing techniques. One such technique is the four-step technique. This technique initially examines eight image blocks within the reference frame that are two pixels away from an image block that a predicted motion vector identifies in the reference frame. If any of the examined image blocks is a better match for the image block of the current frame, the four-step process sets the best matching image block as the current best image block. In its subsequent iteration or iterations, the four step process continues examining eight image blocks that are two pixels away from the current best image block until, in one iteration, the process determines that none of the surrounding image blocks is a better match for the current-frame image block than the current best image block. When the process determines that the current best image block is a better match than each of the image blocks that are two pixels away from the current best image block, the process examines eight image blocks that are one pixel away from the current best image block in the reference frame. The process then defines the matching image block as the image block that this last examination identified as the best matching one.

Existing motion estimation techniques often statically solve each motion estimation problem in the same manner. For instance, the initial motion vector can identify an initial image block that may be, or may be close to, an acceptable match for the current-frame image block. Alternatively, the initial motion-vector might identify an initial image block that is far from an acceptable match. However, in both these situations, prior motion estimation techniques typically perform the same motion estimation operations irrespective of the quality of the initial motion estimation. Therefore, there is a need in the art for an adaptive motion estimation technique that treats different motion estimation problems differently.

SUMMARY OF THE INVENTION

Some embodiments of the invention provide a method for adaptively performing motion estimation. In some embodiments, the method initially performs a first motion estimation operation. It then determines whether the estimated error in the result of the first motion estimation is greater than a particular threshold. If not, the method uses the results of the first motion estimation operation. Otherwise, the method selects another motion estimation operation. The method continues in this manner until it performs a motion estimation operation that results in an acceptable estimated error, or until it tries all the motion estimation operations at its disposal. When the method cannot identify a motion estimation operation that produces results with an acceptable estimated error, the method selects the result of the motion estimation operation that produced the best results.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Several embodiments of the invention will now be described by reference to FIGS. 1-7. Some of the embodiments described below use a hierarchical motion estimation approach. One of ordinary skill, however, will realize that many aspects of the invention can be used with other motion estimation techniques. Also, several embodiments described below try to estimate the motion of an array of image values that are obtained from a current frame by searching for matching arrays of image values that are obtained from a reference frame. In some embodiments, the image array values are two-dimensional arrays of luminance values. For instance, in some embodiments, the image arrays are 16-by-16, 8-by-8, or 4-by-4 blocks of luminance values. In MPEG encoding, it is common to perform motion estimation for 16-by-16 blocks, which are typically called macroblocks.

Each position in an image array obtained from a current frame or a reference frame might correspond to a particular pixel in its corresponding current or reference frame. In such a case, each pixel value in the array is the color-component (e.g., luminance) value of its corresponding pixel. Alternatively, each position in an image array might not correspond to a particular pixel in its frame, but rather might represent the color-component value of several adjacent pixels. Hence, this document states that the image arrays "are obtained" from the current frame or the reference frame to cover both the case where there is a one-to-one correspondence between the color values and the pixels in the frames, and the cases where there is no such one-to-one correspondence.

Figure 1:
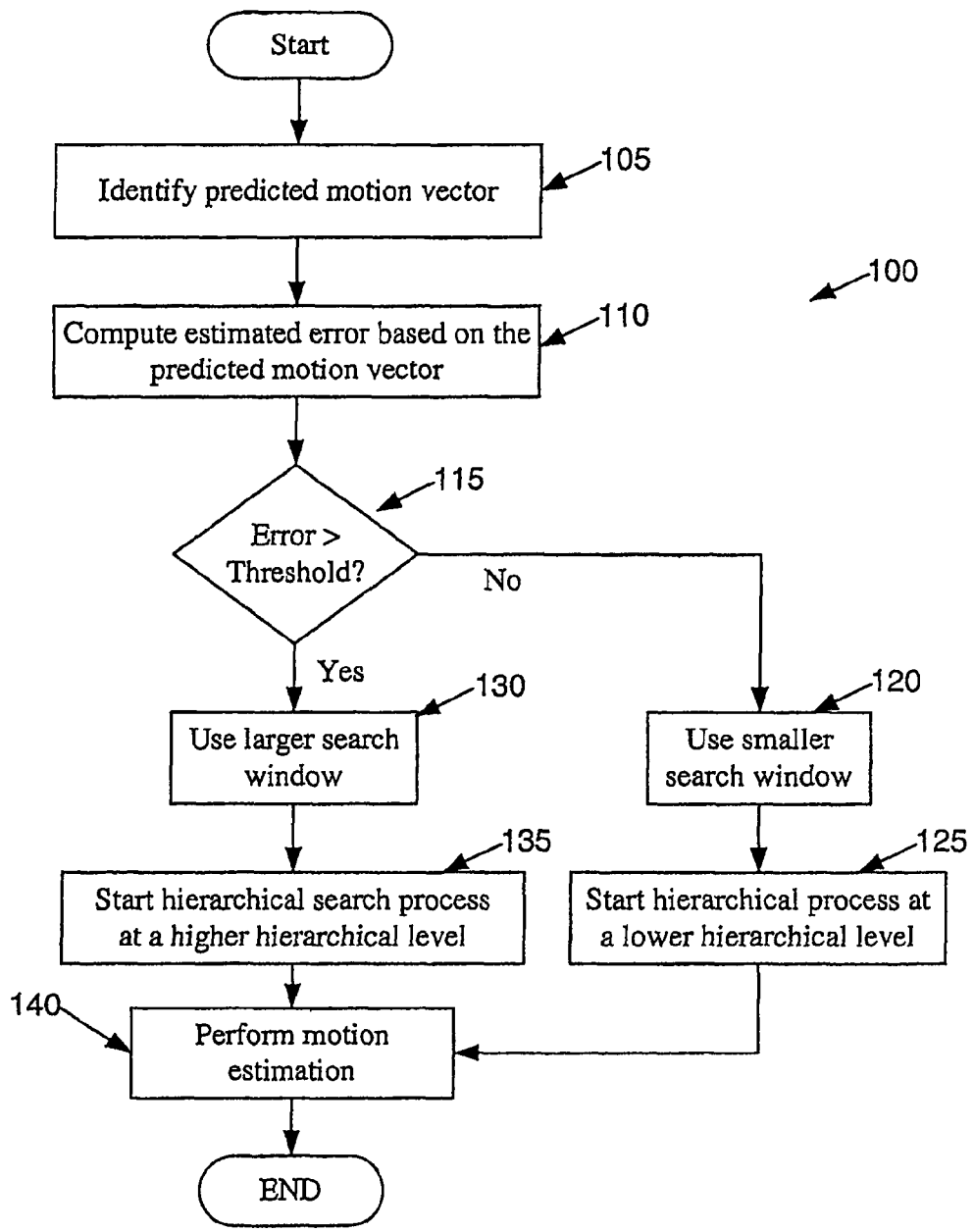
FIG. 1 illustrates a process that dynamically sets motion-estimation parameters based on the estimated accuracy of a predicted motion vector.

FIG. 1 illustrates a process 100 that a motion estimator uses to dynamically set motion-estimation parameters based on the estimated accuracy of a predicted motion vector. This process initially identifies (at 105) a predicted motion vector. Some embodiments identify the predicted motion vector by first initializing this vector for a first image array of the current frame. Different embodiments initialize the predicted motion vector for the first image array differently. For instance, some embodiments set this predicted motion vector to zero, while others set this vector to the vector of the image array in a previous image that corresponds to the first image array.

Figure 2:
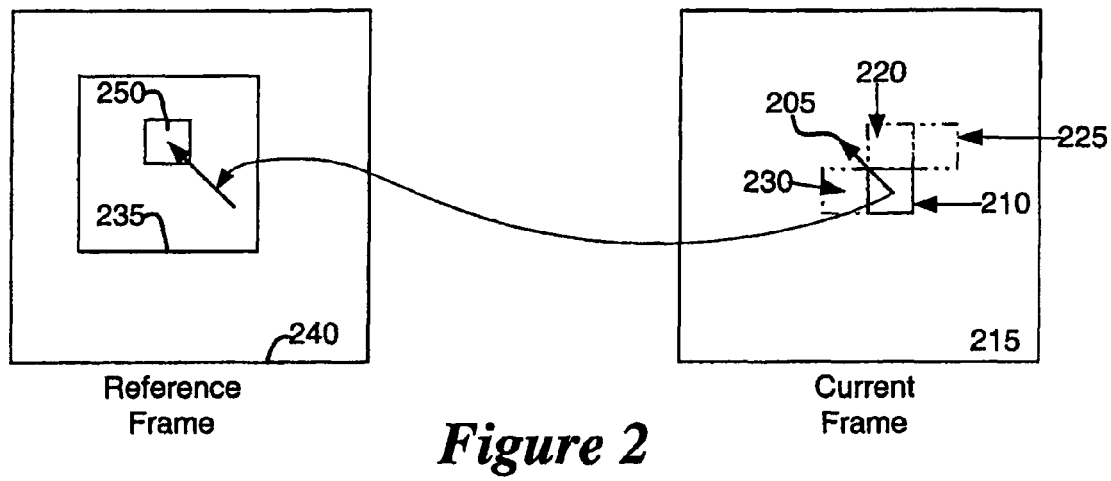
FIG. 2 illustrates one manner for specifying a predicted motion vector for the process of FIG. 1.

For each particular subsequent image array of the current frame, these embodiments then set this vector based on the predicted vectors of the image arrays that surround the particular image array. FIG. 2 illustrates one such manner for specifying the predicted vectors. Specifically, this figure illustrates the predicted motion vector 205 of an array 210 in a current frame 215. This predicted motion vector is computed as the median of the motion vectors of arrays 220, 225, and 230. These three arrays are adjacent to array 210, and the motion estimator previously specified their motion vectors.

FIG. 2 also illustrates the use of a motion vector to perform a motion estimation search. Specifically, it illustrates that once the predicted motion vector 205 is specified for the array 210, a hierarchical search is performed within a search window 235 in the reference frame 240. This search is for an array that closely resembles the array 210. As shown in this figure, this search starts at the location 250 specified by the predicted motion vector 205.

After 105, the process 100 computes (at 110) an estimated error based on the predicted motion vector. Different embodiments use different error metrics to quantify the estimated error. Some embodiments use the mean absolute difference ("MAD") metric. This metric quantifies the error in the following manner:

$$MAD = \frac{1}{N_p} \sum_i |x_i - y_i|. \quad (1)$$

In the above equation (1), the summation of the absolute value terms equals the difference between pixel values $x_i$ of the current-frame array with pixel values $y_i$ of the reference-frame array that was identified by the predicted motion vector, which was identified at 105. Also, $N_p$ is the number of pixels in the current-frame array, and i is a variable from 1 to $N_p$.

Next, the process determines (at 115) whether the estimated error is greater than a threshold value. If so, the process specifies (at 130) a large search window and sets (at 135) the starting hierarchical level of the motion estimation search to a higher hierarchical level, before performing a motion estimation operation at 140. Otherwise, when the estimated error is not greater than the threshold value, the process specifies (at 120) a smaller search window and sets (at 125) the starting hierarchical level of the motion estimation search to a lower hierarchical level, before performing the motion estimation operation at 140.

Figure 3:
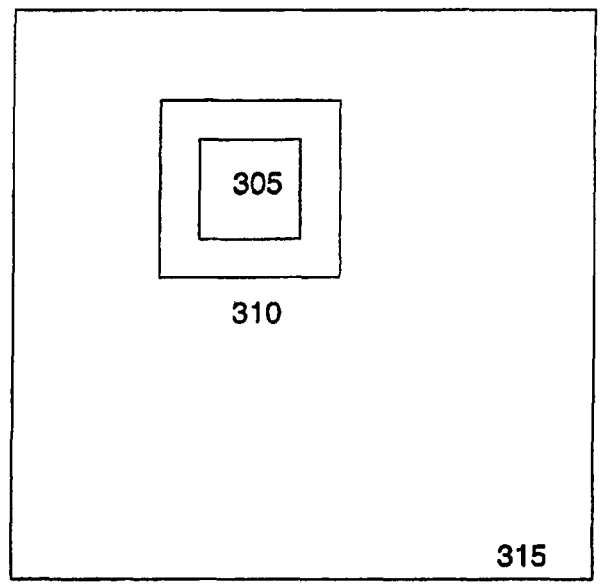
FIG. 3 illustrates two different search windows and that can be used to search for a matching block in a reference frame.
Figure 4:
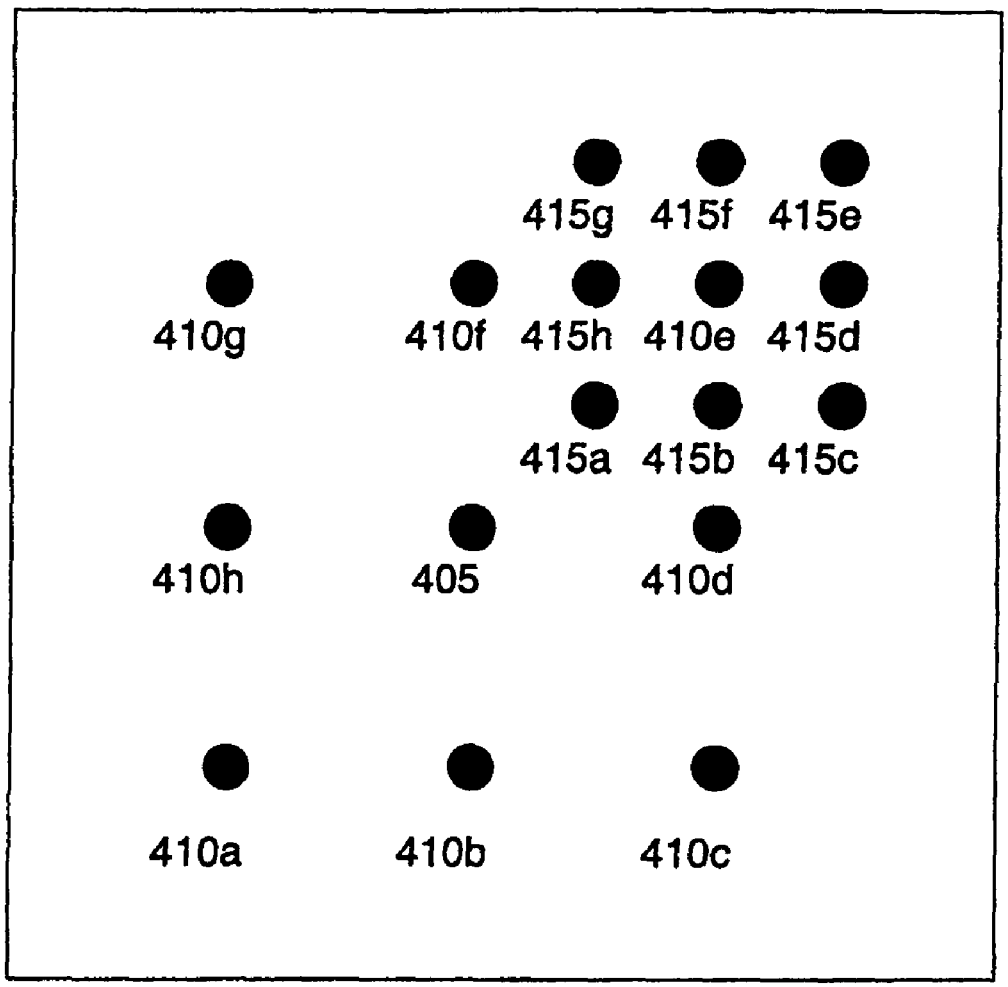
FIG. 4 illustrates one type of hierarchical motion-estimation search.

FIGS. 3 and 4 provide examples of search window and hierarchical levels that can be specified by the process 100 at 120, 125, 130, and 135. Specifically, FIG. 3 illustrates two different search windows 305 and 310 that can be used to search for a matching array in a reference frame 315. In some instances, the reference frame is the frame before the current frame, but this does not necessarily have to be the case. When the error computed (at 115) by the process 100 is small, it can be assumed that an accurate match can be found close to the location specified by the predicted motion vector. In this case, a small search window is used so that the motion estimation finishes quickly while returning an accurate vector. If the error estimated at 115 is large, a bigger search window is used, since it can not be assumed that an accurate match can be found close to the location specified by the predicted vector. The larger search window increases the chance that the motion estimator will find an acceptable match. However, searching the larger space may take a significantly longer time.

FIG. 3 shows the large and small search windows to be centered about the same point, which, in some embodiments, is the location of the center of the array (e.g., macroblock) in the current frame. In other embodiments, the smaller search window is centered about the predicted location. However, in some of these embodiments, this search window would never extend beyond the large search window. In other words, the small search window would be clipped by the larger one.

FIG. 4 illustrates one type of hierarchical motion-estimation search. This search starts by comparing the current-frame array with several different reference-frame arrays that are located (e.g., have their center or a vertex) (1) at a location 405 that is specified by the predicted motion vector and (2) at location 410a-410h that neighbors the location 405. The neighboring locations 410a-410h are a particular distance (referred to as the "step-size") away from the predicted location 405. For instance, in FIG. 4, the distance between locations 410a-410h and location 405 is 8 pixels.

To compare the current-frame array with a reference-frame array, some embodiments generate a difference metric score, e.g., generate a score according to the above-mentioned MAD metric. These embodiments then identify the reference-frame array with the best difference metric score. These embodiments then perform a finer search about the identified array. For instance, in the example illustrated in FIG. 4, the reference-frame array located at 410e has the best difference metric cost after the first iteration. Accordingly, after examining locations 410a-410h that are 8 pixels away from the predicted location 405, the search process examines locations 415a-415h that are four pixels away from the location 410e. This hierarchical process can continue until the step size equals 1 (i.e., until the analyzed pixel locations are separated by 1 pixel). The location with the best difference metric score at the final hierarchical level is then selected as one end (e.g., the destination) of the motion vector. The other end (e.g., the source) of the motion vector is the location (e.g., location-defining center or vertex) of the current-frame array.

When the error computed (at 115) by the process 100 is small, then it is assumed that the location for the best matching reference-frame array lies close to the predicted motion vector. Hence, for the hierarchical process illustrated in FIG. 4, the process 100 sets (at 125) the initial step size to a lower value (e.g., four or two as opposed to 8) since a fine granularity search around the predicted motion vector will likely be sufficient. However, if the error estimated at 115 is large, the process 100 sets (at 135) the initial step size to a higher value (e.g., eight) since the best matching reference-frame is probably far from the predicted motion vector, and the larger step size increases the chance that the motion estimator will find an acceptable match. However, starting with the larger step size increases the search time.

Figure 5:
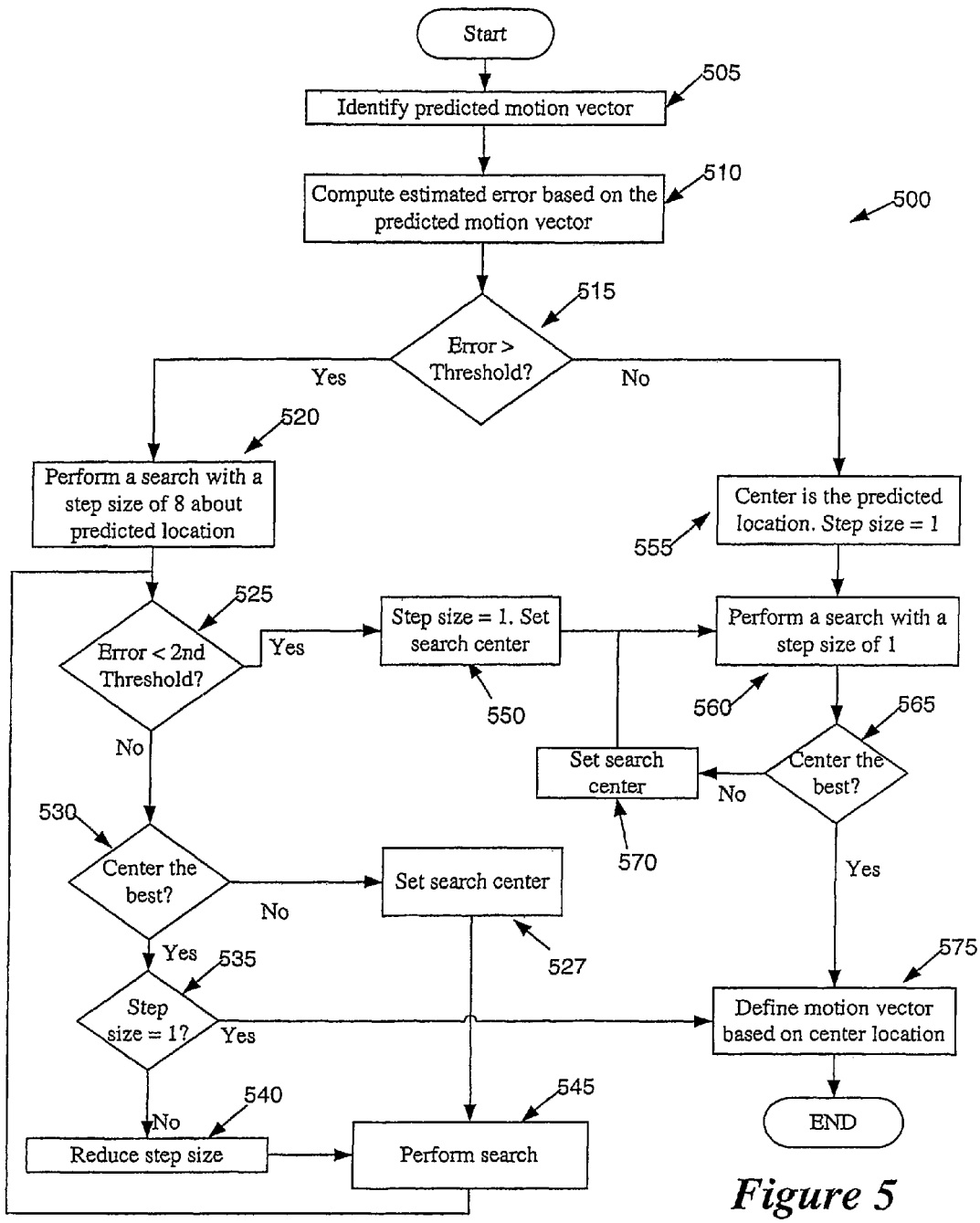
FIG. 5 illustrates an adaptive, hierarchical motion-estimation process of some embodiments of the invention.

FIG. 5 illustrates an adaptive, hierarchical motion-estimation process 500 of some embodiments of the invention. This process is a modification of the four-step process that was described in the background. This process initially identifies (at 505) a predicted motion vector. One manner for identifying a predicted motion vector was described above by reference to FIG. 2. After 505, the process 500 computes (at 510) an estimated error based on the predicted motion vector. One manner for computing such an error was described above by reference to equation (1).

Next, the process determines (at 515) whether the estimated error is greater than a threshold value. If so, the process specifies (at 520) the step size as 8. At 520, the process then compares the current-frame array with several different reference-frame arrays that are located (e.g., have their center or a vertex) (1) at a search-center location (e.g., 405 in FIG. 4) that is specified by the predicted motion vector and (2) at locations (e.g., 410a-410h in FIG. 4) that are 8 pixels away from the search center location (e.g., 405 in FIG. 4). As mentioned above, some embodiments compare the current-frame array with a reference-frame array by generating a difference metric score, such as an MAD metric. These embodiments then identify the reference-frame array with the best difference metric score.

At 525, the process then determines whether the best difference metric score is less than a second threshold. This second threshold is different than the threshold used at 515 in some embodiments, while it is equal to this threshold in other embodiments. If the difference is less than the second threshold, the process sets (at 550) the step size to 1, and defines the search-center location as the location with the best difference metric score in the last search. It then transitions to 560, which is further described below.

If the process determines (at 525) that the best difference metric score in the last search (which, in this loop, might have been performed at 520 as described above, or at 545 as described below) is not less than the second threshold, it determines (at 530) whether the current center of the search provided the best difference metric score. If not, the process defines (at 527) the current search center as the examined location that provided the best difference metric score in the last search. From 527, the process transitions to 545, which is further described below.

If the process determines (at 530) that the current search center provided the best difference metric score, the process determines (at 535) whether the step size equals 1. If the step size is 1, the process then transitions to 575, which is further described below. If the step size is not 1, the process reduces (at 540) the step size. In some embodiments, the process reduces the step size by dividing the current step size by 2. From 540, the process transitions to 545. The process also transitions to 545 from 527.

At 545, the process performs a search about the current search center. This search entails comparing the current-frame array with several different reference-frame arrays that are located (e.g., have their center or a vertex) (1) at the current search-center location and (2) at locations that are the current step size away from the search center location. Some embodiments compare (at 545) the current-frame array with a reference-frame array by generating a difference metric score. These embodiments then identify (at 545) the reference-frame array with the best difference metric score. From 545, the process transitions to 525, which was described above.

If the process determines (at 515) that the estimated error computed at 510 is less than or equal to the first threshold, the process sets (at 555) the search center as the predicted location. At 555, the process also sets the step size to 1. From 555, the process transitions to 560. As mentioned above, the process also transitions to 560 from 550.

At 560, the process performs a search about the current search center. This search entails comparing the current-frame array with several different reference-frame arrays that are located (e.g., have their center or a vertex) (1) at the current search-center location and (2) at locations that are 1 pixel away from the search center location. Some embodiments compare (at 560) the current-frame array with a reference-frame array by generating a difference metric score. These embodiments then identify (at 560) the reference-frame array with the best difference metric score.

After 560, the process determines (at 565) whether the current search center provided the best metric score identified at 560. If not, the process sets (at 570) the search center to the examined location that provided the best difference metric score in the last search. It then transitions back to 560, which was described above.

If the process determines (at 565) that the current search center provided the best difference metric score at 560, the process transitions to 575. As mentioned above, the process also transitions to 575 from 535. At 575, the process defines the motion vector based on the current search center. After 575, the process ends.

Figure 6:
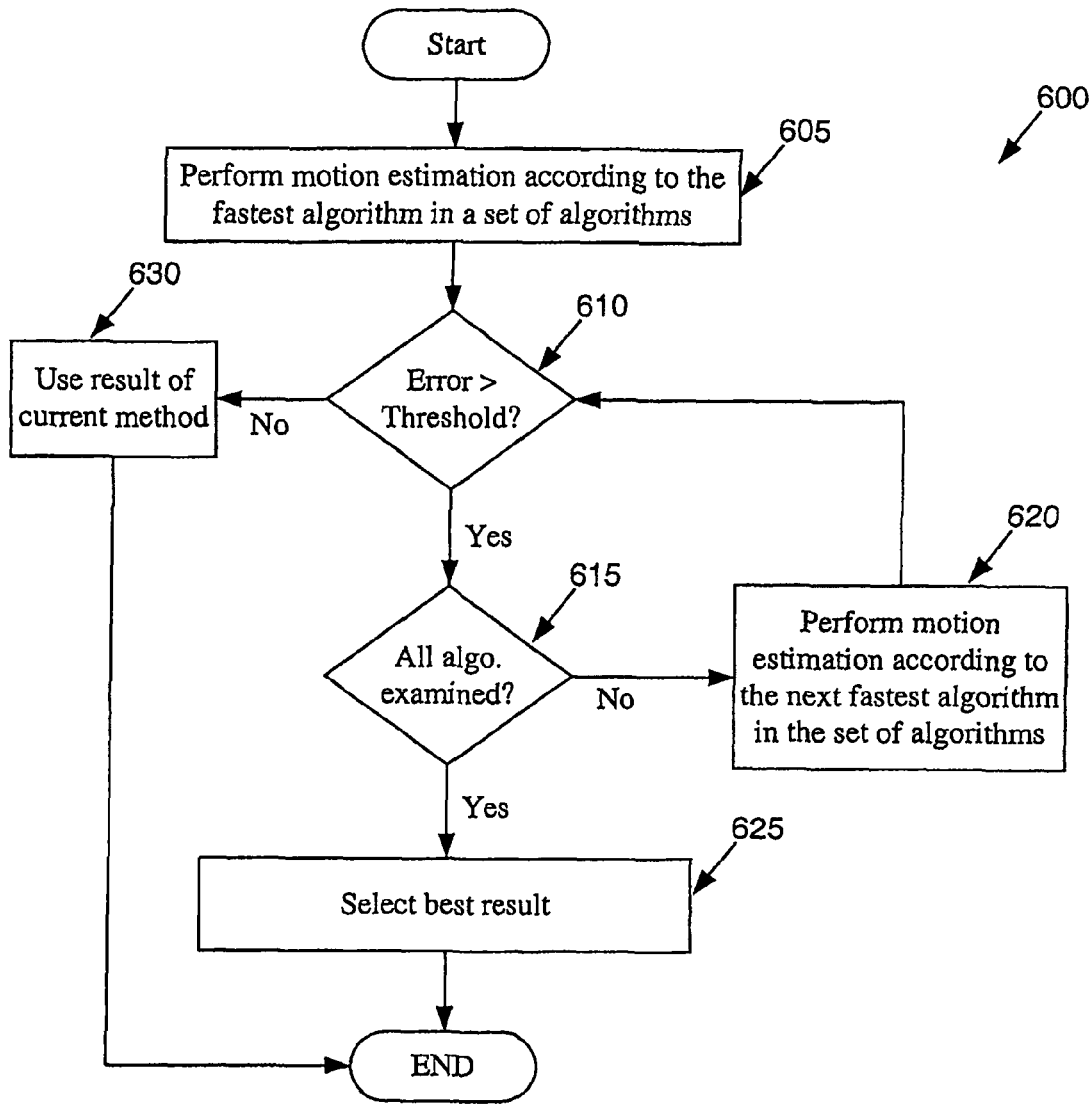
FIG. 6 illustrates a process used by some embodiments of the invention.

FIG. 6 illustrates a process 600 used by some embodiments of the invention. This process can dynamically examine different motion-estimation techniques in order to identify one technique that produces an acceptable result. Some embodiments perform this process to try to identify a motion vector for each current-frame array. Before this process starts, some embodiments specify a list that identifies different motion estimation techniques in a sorted order from the expected fastest to the expected slowest. Several examples of motion estimation techniques were described above by reference to FIGS. 1-5. An example of a list of motion estimation techniques includes the following three searches in the order that they are listed: a conventional "three-step search", the modified-four-step search of FIG. 5, and a conventional "full search".

The process 600 initially performs (at 605) the fastest motion estimation operation on the specified list. In some embodiments, each motion estimation operation on the list provides a motion vector and an estimated error. The motion vector specifies how much a current-frame array has moved since it appeared in the reference frame. Each motion estimator identifies this motion vector by searching for an array in the reference frame that most closely matches the current-frame array. It identifies the best reference-frame array that it encounters during its search and uses this reference-frame array to specify the motion vector.

The estimated error generated by a motion estimator quantifies the difference between the current-frame array and the best reference-frame array that it encountered during its search. Different embodiments use different error metrics to quantify the estimated error. Some embodiments use the mean absolute difference ("MAD") metric, which was described above by reference to equation (1).

Next, the process determines (at 610) whether the estimated error is greater than a threshold value. If so, the process determines (at 615) whether it has examined all the motion estimation operations that are specified on the sorted list. When it has not examined all these operation, the process performs (at 620) the next fastest motion estimation operation and transitions back to 610, which was described above. If the subsequent motion estimation operation (at 620) needs a predicted motion vector to start, the process 600 in some embodiments uses the motion vector of the previous motion estimation operation.

If the process determines (at 615) that it has examined all motion estimation operations without finding one that produced an acceptable result, the process selects the motion vector of the best result (i.e., the result that had the smallest estimated error) as the output of the motion estimation stage, and then ends.

On the other hand, if the process determines (at 610) that the estimated error of a particular motion estimation operation is not greater than a threshold, it selects (at 630) the motion vector of the particular motion estimation operation as the output of the motion estimation stage, and then ends. By sorting the motion estimation operations in a descending order based on their speed, the process 600 ensures that it finds an acceptable result in the fastest possible way.

Figure 7:
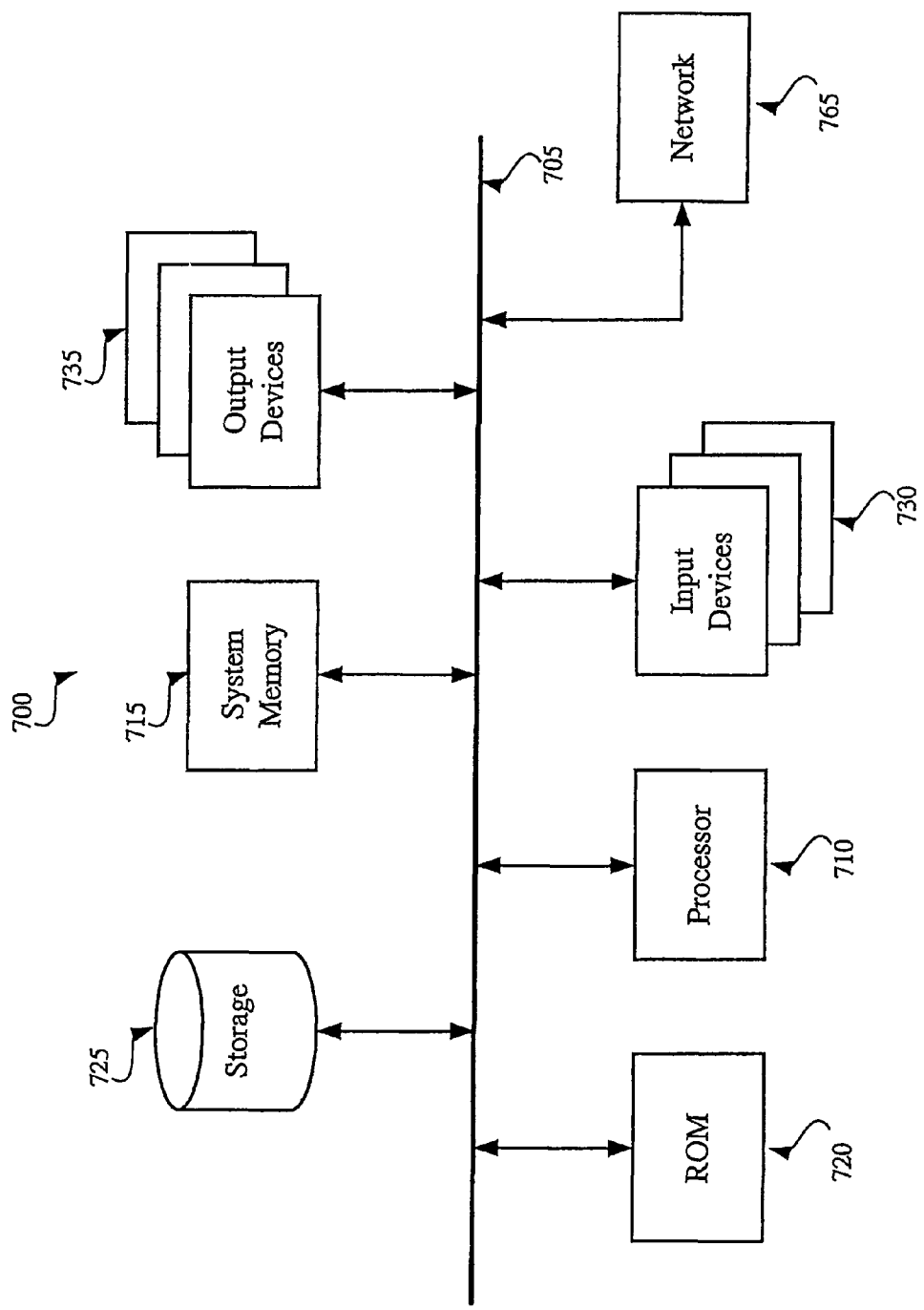
FIG. 7 presents a computer system with which one embodiment of the invention is implemented.

FIG. 7 presents a computer system with which one embodiment of the invention is implemented. Computer system 700 includes a bus 705, a processor 710, a system memory 715, a read-only memory 720, a permanent storage device 725, input devices 730, and output devices 735. The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725.

From these various memory units, the processor 710 retrieves instructions to execute and data to process in order to execute the processes of the invention. The read-only-memory (ROM) 720 stores static data and instructions that are needed by the processor 710 and other modules of the computer system. The permanent storage device 725, on the other hand, is read-and-write memory device. This device is a non-volatile memory unit that stores instruction and data even when the computer system 700 is off. Some embodiments of the invention use a mass-storage device (such as a magnetic or optical disk and its corresponding disk drive) as the permanent storage device 725.

Other embodiments use a removable storage device (such as a floppy disk or Zip® disk, and its corresponding disk drive) as the permanent storage device. Like the permanent storage device 725, the system memory 715 is a read-and-write memory device. However, unlike storage device 725, the system memory is a volatile read-and-write memory, such as a random access memory. The system memory stores some of the instructions and data that the processor needs at runtime. In some embodiments, the invention's processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keyboards and cursor-controllers. The output devices 735 display images generated by the computer system. For instance, these devices display IC design layouts. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet) or a network of networks (such as the Internet). Any or all of the components of computer system 700 may be used in conjunction with the invention. However, one of ordinary skill in the art would appreciate that any other system configuration may also be used in conjunction with the present invention.

The adaptive motion estimation processes that were described above have several advantages. For instance, unlike existing motion estimation techniques that statically solve each motion estimation problem in the same manner, these motion estimation processes of the invention treat different motion estimation problems differently. The process 100 of FIG. 1, for example, dynamically sets the motion estimation parameters at the start of the motion estimation search based on the quality of the initial motion estimation. The process 500 of FIG. 5 similarly sets the motion estimation parameters at the start of its operations. In this manner, both the processes 100 and 500 speed up their motion estimation operations when their initial motion estimations are close to being acceptable. The process 600 of FIG. 6 is also intended to speed up the motion estimation process by sorting the motion estimation techniques in a descending order based on their speed, and examining successive techniques until one produces an acceptable solution.

While the invention has been described with reference to numerous specific details, one of ordinary skill in the art will recognize that the invention can be embodied in other specific forms without departing from the spirit of the invention. For instance, although the process 100 selects between only two different search windows and two different initial step sizes, other embodiments might select among three or more different search windows and/or step sizes. Also, some embodiments might only adaptively select the search window or the step size, but not both.

The process 100 was described above by reference to the step-size reducing motion estimation process of FIG. 4. This process could just as well been described by reference to another hierarchical motion-estimation operation, such as an operation that examines image arrays at different image resolutions (e.g., examine down-sampled image arrays, and then examines image arrays at higher and higher resolutions). In such a case, the process 100 of FIG. 1 might start the motion estimation on a coarser resolution level when it detects (at 115) that the computed error exceeds the threshold, or it might start the motion estimation at a lower finer resolution level when it detects (at 115) that the computed error does not exceed the threshold.

Also, as the estimated error increases, some embodiments might adaptively select different reference frames to examine (i.e., the might adaptively search across time). In addition, even though hierarchical motion-estimation searches were described above, other embodiments might utilize other motion-estimation searches. Furthermore, the process 500 starts using a step size of 1 when it determines (at 515) that the predicted array's error is less than a threshold. Other embodiments, however, might not reduce the step size to 1 in this situation. For instance, some might reduce the step size to 2 or 4, in order to allow the hierarchical search to perform a coarser search about the predicted location. Thus, one of ordinary skill in the art would understand that the invention is not to be limited by the foregoing illustrative details, but rather is to be defined by the appended claims.

We claim:

1. A non-transitory computer readable medium storing a computer program that when executed by at least one processor performs motion estimation for an image array obtained from a current image in a sequence of video images, the computer program comprising sets of instructions for:
   performing a first motion estimation process that searches for the image array in a reference image in the sequence of images (i) to identify a first motion vector that provides a first estimate of a motion of the image array between the current image and the reference image, and (ii) to obtain a first error estimate for the first estimate of the motion of the image array;
   when the first error estimate is greater than a threshold value, performing a second different motion estimation process that searches for the image array in the reference image (i) to identify a second motion vector that provides a second estimate of the motion of the image array between the current image and the reference image, and (ii) to obtain a second error estimate for the second estimate of the motion of the image array;
   when the second error estimate is greater than the threshold value, performing a third motion estimation process to obtain a third estimate of the motion of the image array between the current image and the reference image; and
   encoding said current image based the motion of the image array.

2. The non-transitory computer readable medium of claim 1, wherein the computer program further comprises a set of instructions for specifying the first estimate of the motion of the image array as a final estimate of the motion of the image array when the first error estimate is less than or equal to the threshold value.

3. The non-transitory computer readable medium of claim 1, wherein the set of instructions for performing the first motion estimation process comprises sets of instructions for:
   comparing the image array obtained from the current image with a set of different reference image arrays that are obtained from the reference image, wherein the image array obtained from the current image is a current-image array and each image array obtained from the reference image is a reference-image array;
   identifying a particular reference-image array that is least different from the current-image array based on the comparison; and
   identifying the first motion vector based on a position of the current-image array in the current image and a position of the particular reference-image array in the reference image.

4. The non-transitory computer readable medium of claim 3, wherein the computer program further comprises a set of instructions for computing the first error estimate by aggregating an absolute value of a difference between corresponding image values in the current-image array and the particular reference-image array.

5. The non-transitory computer readable medium of claim 3, wherein the set of instructions for comparing the current-image array and the set of different reference-image arrays comprises a set of instructions for aggregating an absolute value of a difference between corresponding image values in the current-image array and the particular reference-image array.

6. The non-transitory computer readable medium of claim 1, wherein the image array specifies image values for a two-dimensional set of pixels in the current image.

7. The non-transitory computer readable medium of claim 6, wherein the set of pixels is a macroblock that has a width of 16 pixels and a height of 16 pixels.

8. The non-transitory computer readable medium of claim 1, wherein the computer program further comprises a set of instructions for specifying the second estimate of the motion of the image array as a final estimate of the motion of the image array when the second error estimate is less than or equal to the threshold value.

9. The non-transitory computer readable medium of claim 1, wherein each of the motion estimation processes performs at least one search in at least one reference image to obtain the corresponding estimate of the motion of the image array.

10. The non-transitory computer readable medium of claim 1, wherein the motion estimation processes are sorted from an expected fastest to an expected slowest, wherein the computer program further comprises sets of instructions for iteratively selecting each of the motion estimation processes according to the sorted order to obtain the corresponding estimate of the motion of the image array and to obtain the corresponding error estimate.

11. The non-transitory computer readable medium of claim 10, wherein the set of instructions for performing the third motion estimation process comprises a set of instructions for obtaining a third error estimate for the third estimate of the motion of the image array, wherein the computer program further comprises a set of instructions for specifying the third estimate of the motion of the image array as a specified estimate of the motion of the image array when the third error estimate is less than or equal to the threshold value.

12. The non-transitory computer readable medium of claim 10, wherein the computer program further comprises a set of instructions for selecting a lowest error estimate from each of the error estimates produced from performing each of the motion estimation processes as a selected estimate of the motion of the image array when none of the error estimates is less than or equal to the threshold value.

13. A non-transitory computer readable medium storing a computer program that when executed by at least one processor performs motion-estimation for an image array obtained from a current image in a sequence of video images, the computer program comprising sets of instructions for:
   iteratively:
      selecting a particular motion-estimation searching process from a list of at least three different motion-estimation searching processes that are sorted from an expected fastest to an expected slowest;
      performing the particular motion-estimation searching process that searches for the image array in a reference image in the sequence of video images (i) to identify a motion vector that provides an estimate of a motion of the image array and (ii) to identify a motion-estimation error for the estimate of the motion of the image array, the iterative selecting and performing terminated when the identified motion-estimation error meets a same threshold; and
   encoding said current image based the motion of the image array.

14. The non-transitory computer readable medium of claim 13, wherein each particular motion-estimation searching process produces a motion estimation, wherein the computer program further comprises a set of instructions for defining a particular motion estimation that meets the same threshold as a specified estimate of a motion of a set of pixels in an image of the video.

15. The non-transitory computer readable medium of claim 13, wherein the set of instructions for selecting the particular motion-estimation searching process comprises a set of instructions for selecting, during each iteration, an expected-fastest motion-estimation searching process in the list that has not been selected.

16. The non-transitory computer readable medium of claim 13, wherein the list of motion-estimation searching processes comprises a third motion-estimation searching process that is different from the first and second processes.

17. The non-transitory computer readable medium of claim 16, wherein the first motion-estimation searching process is designated as a faster process than the second motion-estimation searching process, and the second motion-estimation searching process is designated as a faster process than the third motion-estimation searching process.

18. A method of performing motion estimation for an image array obtained from a current image in a sequence of video images, the method comprising:
performing a first motion estimation process that searches for the image array in a reference image in the sequence of images (i) to identify a first motion vector that provides a first estimate of a motion of the image array between the current image and the reference image, and (ii) to obtain a first error estimate for the first estimate of the motion of the image array;
when the first error estimate is greater than a threshold value, performing a second different motion estimation process that searches for the image array in the reference image (i) to identify a second motion vector that provides a second estimate of the motion of the image array between the current image and the reference image, and (ii) to obtain a second error estimate for the second estimate of the motion of the image array;
when the second error estimate is greater than the threshold value, performing a third motion estimation process to obtain a third estimate of the motion of the image array between the current image and the reference image; and
encoding said current image based the motion of the image array.

19. The method of claim 18, wherein the first motion estimation process is designated as a faster process than the second motion estimation process, and the second motion estimation process is designated as a faster process than the third motion estimation process.

20. The method of claim 18 further comprising receiving a sorted list comprising a plurality of motion estimation processes, the sorted list comprising the first motion estimation process that, based on prior analysis, is expected to be a fastest process in the plurality of motion estimation processes and a last motion estimation process that, based on the prior analysis, is expected to be a slowest process in the plurality of motion estimation processes, wherein performing the motion estimation processes comprises iteratively performing one or more of the plurality of motion estimation processes according to the sorted list.

21. A method of performing motion-estimation for an image array obtained from a current image in a sequence of video images, the method comprising:
iteratively:
selecting a particular motion-estimation searching process from a list of at least three different motion-estimation searching processes that are sorted from an expected fastest to an expected slowest;
performing the particular motion-estimation searching process that searches for the image array in a reference image in the sequence of video images (i) to identify a motion vector that provides an estimate of a motion of the image array and (ii) to identify a motion-estimation error for the estimate of the motion of the image array, the iterative selecting and performing terminated when the identified motion-estimation error meets a same threshold; and
encoding said current image based the motion of the image array.

22. The method of claim 21, wherein each particular motion-estimation searching process produces a motion estimation, the method further comprising defining a particular motion estimation that meets the same threshold as a specified estimate of a motion of a set of pixels in an image of the video.

23. The method of claim 21, wherein selecting the particular motion-estimation searching process comprises selecting, during each iteration, an expected-fastest motion-estimation searching process in the list that has not been selected.

24. The method of claim 21, wherein the list of motion-estimation searching processes comprises a third motion-estimation searching process that is different from the first and second processes.

25. The method of claim 24, wherein the first motion-estimation searching process is designated as a faster process than the second motion-estimation searching process, and the second motion-estimation searching process is designated as a faster process than the third motion-estimation searching process.

* * * * *

UNITED STATES PATENT AND TRADEMARK OFFICE
CERTIFICATE OF CORRECTION

PATENT NO. : 8,254,459 B2
APPLICATION NO. : 12/772971
DATED : August 28, 2012
INVENTOR(S) : Roger Kumar et al.

Page 1 of 1

It is certified that error appears in the above-identified patent and that said Letters Patent is hereby corrected as shown below:

In the Claims:

Claim 1, column 9, line 11, "images" should read "video images".

Claim 12, column 10, line 36, "is" should read "are".

Claim 14, column 10, line 65, "video" should read "sequence of video images".

Claim 16, column 11, line 8, "processes" should read "motion-estimation searching processes that are in the list".

Signed and Sealed this
Fourth Day of June, 2013

Teresa Stanek Rea
*Acting Director of the United States Patent and Trademark Office*